(12) United States Patent
Robertson et al.

(10) Patent No.: US 8,235,515 B2
(45) Date of Patent: Aug. 7, 2012

(54) THERMAL INK JET INK COMPOSTION

(75) Inventors: Casey Robertson, Romeoville, IL (US); Anthony Selmeczy, West Chicago, IL (US)

(73) Assignee: Videojet Technologies Inc.

(*) Notice: Subject to any disclaimer, the term of this patent is extended or adjusted under 35 U.S.C. 154(b) by 0 days.

(21) Appl. No.: 13/242,938

(22) Filed: Sep. 23, 2011

(65) Prior Publication Data

US 2012/0013684 A1      Jan. 19, 2012

Related U.S. Application Data

(63) Continuation of application No. PCT/US2010/050660, filed on Sep. 29, 2010.

(60) Provisional application No. 61/247,027, filed on Sep. 30, 2009.

(51) Int. Cl.
   *B41J 2/17*   (2006.01)
(52) U.S. Cl. .............................. 347/95; 347/100; 347/56
(58) Field of Classification Search ............... 347/20, 347/56, 61–65, 67, 95, 100; 106/31.6, 31.13, 106/31.27; 523/160–161
See application file for complete search history.

(56) References Cited

U.S. PATENT DOCUMENTS

| | | | |
|---|---|---|---|
| 4,155,767 A | 5/1979 | Specht | |
| 4,165,399 A | 8/1979 | Germonprez | |
| 4,166,044 A | 8/1979 | Germonprez | |
| 4,767,459 A | 8/1988 | Greenwood | |
| 5,164,232 A | 11/1992 | Henseleit | |
| 5,376,169 A | 12/1994 | Hotomi | |
| 5,451,251 A | 9/1995 | Mafune | |
| 5,574,078 A | 11/1996 | Elwakil | |
| 5,803,958 A | 9/1998 | Katsen | |
| 6,010,564 A * | 1/2000 | Zhu et al. | 106/31.37 |
| 6,602,334 B1 | 8/2003 | Kaufmann | |
| 7,163,575 B2 | 1/2007 | Kwan | |
| 7,270,406 B2 | 9/2007 | Raggatt | |
| 7,287,836 B2 * | 10/2007 | Silverbrook | 347/56 |
| 7,794,033 B2 | 9/2010 | Schaeffer | |
| 8,142,558 B2 | 3/2012 | Robertson | |
| 2002/0140766 A1 | 10/2002 | Niederhausern | |
| 2009/0234067 A1 | 9/2009 | Kariya | |
| 2011/0063371 A1 | 3/2011 | Grant | |
| 2011/0064920 A1 | 3/2011 | Grant | |

* cited by examiner

*Primary Examiner* — Juanita D Jackson
(74) *Attorney, Agent, or Firm* — Joseph A. Yosick

(57) ABSTRACT

A solvent-based ink composition for a thermal inkjet printhead includes (a) 55-90 wt. % of an organic solvent including a ketone and a $C_1$ to $C_4$ alcohol; and (b) 0.01-10 wt. % of a colorant.

27 Claims, No Drawings

THERMAL INK JET INK COMPOSTION

CROSS REFERENCE TO RELATED APPLICATIONS

This application is a Continuation of PCT international application No. PCT/US10/50660, filed Sep. 29, 2010 which designates the U.S., which claims priority to U.S. Provisional Application No. 61/247,027, filed Sep. 30, 2009, both of which are incorporated herein by reference in their entireties.

BACKGROUND OF THE INVENTION

Thermal ink jet (TIJ) print heads produce ink droplets from thermal vaporization of the ink solvent. In the jetting process, a resistor is heated rapidly to produce a vapor bubble which subsequently ejects a droplet from the orifice. This process is extremely efficient and reproducible. Modern TIJ print heads for industrial graphics applications are capable of generating uniform drops of 4 pL or smaller in volume at frequencies of 36 kHz or greater. Typical commercial TIJ devices are specifically designed to vaporize water or solvents that have physical properties close to those of water (e.g. high boiling point, large heat capacity, low molecular weight).

Although TIJ printing systems have been available for over 30 years, nearly all of the commercial inks available for thermal ink jet systems have been water-based, i.e. they contain more than 50% water. Such aqueous inks have one or more drawbacks such as long ink dry times or poor adhesion to semi-porous or non-porous substrates.

There is a desire for inks with attractive performance characteristics such as short dry times, long decap times and good adhesion when using a TIJ system to print onto semi-porous and non-porous substrates.

BRIEF SUMMARY OF THE INVENTION

The invention provides a thermal ink jet ink composition including one or more volatile organic solvents, one or more solvent dyes that are soluble in the organic solvent or solvents with a solubility of at least 0.1% by weight, and one or more humectants. The thermal ink jet ink composition is preferably free or substantially free of tetrahydrofuran, binder resin, and water. The thermal ink jet ink composition may provide increased decap time and short dry times.

In an embodiment, a thermal ink jet ink composition includes one or more volatile organic solvents, one or more solvent dyes, and one or more humectants. The one or more volatile organic solvents are selected from $C_1$-$C_4$ alcohols, $C_4$-$C_8$ ethers, $C_3$-$C_6$ ketones, $C_3$-$C_6$ esters, and mixtures thereof. The one or more solvent dyes are soluble in the organic solvent or solvents with a solubility of at least 0.1% by weight. The thermal ink jet ink composition is free or substantially free of tetrahydrofuran, binder resin, and water.

In another embodiment, a method of printing an image on a substrate includes providing a thermal ink jet cartridge including a thermal ink jet ink composition. A stream of droplets of the thermal ink jet ink composition is directed onto a substrate. The direction of the droplets is controlled so that the droplets form the desired printed image on the substrate.

The thermal ink jet ink composition of the invention has one or more of the following features: short dry times, long decap times, good adhesion to substrates, safety, and material compatibility. Decap time is defined as the amount of time a nozzle can remain dormant and then be fired again without detrimental effect on the droplet velocity, weight or direction. Fluids with good material compatibility are defined as those which do not degrade the ability of the TIJ cartridge to fire for some reasonable length of time. The thermal ink jet ink composition does not require heat assist (e.g., thermal driers) when printed on semi-porous and non-porous substrates.

DETAILED DESCRIPTION OF THE INVENTION

The disclosure provides a thermal ink jet ink composition including one or more volatile organic solvents, one or more solvent dyes that are soluble in the organic solvent or solvents with a solubility of at least 0.1% by weight, and one or more humectants. The thermal ink jet ink composition is preferably free or substantially free of tetrahydrofuran, binder resin, and water.

Most commercial inks require the use of binders (typically polymers) to achieve good adhesion and flow properties in the final dried film. The use of polymers to promote adhesion is well known, and polymer effects on viscosity and other flow properties are well documented in the literature. Solution polymers can help to create continuous films which impart the adhesion and appearance characteristics required in many applications. The use of binders is especially prevalent when formulating inks for non-porous substrates. In the case of porous media (i.e. plain paper), inks can absorb and incorporate rapidly into the paper matrix, thus eliminating the need for a continuous film. Semi-porous substrates (such as clay-coated paper) may or may not require polymers in order to achieve the requisite appearance and performance characteristics. However for non-porous materials such as metals, glass, plastics, varnish over-coat, UV over-coat, ceramics, etc. good film formation is usually required in order to pass adhesion tests such as rub resistance, scratch resistance, and tape resistance.

For inks that do not contain any polymeric film forming material, it is desirable that the non-volatile components in the ink should be capable of forming a film independently on the substrate of interest. The predominant non-volatile component in binderless ink is a colorant (i.e. pigments, dyes, or combinations thereof); however other non-resinous components can also be included, such as plasticizers, surfactants, slow-evaporating solvents (such as glycol ethers), polyols, and the like.

It is believed that a number of conditions should be met for film formation to occur in a resinless ink system. The colorant should maintain excellent solubility in the solvent mixture used throughout evaporation. Wetting characteristics of the solution should be favorable for the target substrate. The film should have good adhesion to the substrate. The non-volatile components should not aggregate, crystallize, or otherwise form structures which are not conducive to good film formation.

In an embodiment, the thermal ink jet ink composition including one or more volatile organic solvents, one or more solvent dyes that are soluble in the organic solvent or solvents with a solubility of at least 0.1% by weight, and one or more humectants.

In accordance with an embodiment, the volatile organic solvents may be selected from $C_1$-$C_4$ alcohols, $C_4$-$C_8$ ethers, $C_3$-$C_6$ ketones, $C_3$-$C_6$ esters, and mixtures thereof. Examples of $C_1$-$C_4$ alcohols include methanol, ethanol, 1-propanol, and 2-propanol. Examples of $C_4$-$C_8$ ethers include diethyl ether, dipropyl ether, dibutyl ether and tetrahydrofuran. Examples of $C_3$-$C_6$ ketones include acetone, methyl ethyl ketone and cyclohexanone. Examples of $C_3$-$C_6$ esters include methyl acetate, ethyl acetate and n-butyl acetate. The organic solvents, particularly alcohols, ketones, and esters, have an attractive feature that they penetrate semi- and non-porous substrate surfaces more readily than water based inks, thus reducing dry time and improving adhesion. One or more volatile organic solvents may be present.

The one or more volatile organic solvents may be present in any suitable amount, for example, in an amount 50% or more, about 60% or more, about 70% or more, about 80% or more, or about 90% or more by weight of the ink jet ink composition. In an embodiment, the one or more volatile organic solvents may be present in an amount from 50 to about 99%, preferably from about 60 to about 97%, and more preferably from about 80 to about 95% of the ink jet ink composition.

The thermal ink jet ink composition includes one or more dyes. The one or more dyes are selected from acid dyes, basic dyes, solvent dyes, reactive dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes.

For example, the thermal ink jet ink composition can include one or more dyes selected from the group consisting of C.I. Solvent Yellow 19, C.I. Solvent Yellow 21, C.I. Solvent Yellow 61, C.I. Solvent Yellow 80, C.I. Solvent Orange 1, C.I. Orange 37, C.I. Orange 40, C.I. Solvent Orange 54, C.I. Solvent Orange 63, C.I. Solvent Red 8, Solvent Red 49, C.I. Solvent Red 81, C.I. Solvent Red 82, C.I. Solvent Red 84, C.I. Solvent Red 100, C.I. Acid Red 92, C.I. Reactive red 31, Orient Pink 312, C.I. Basic Violet 3, C.I. Basic Violet 4, C.I. Solvent Violet 8, C.I. Solvent Violet 21, C.I. Solvent Blue 2, C.I. Solvent Blue 5, C.I. Solvent Blue 11, C.I. Solvent Blue 25, C.I. Solvent Blue 36, C.I. Solvent Blue 38, C.I. Solvent Blue 55; C.I. Solvent Blue 70, C.I. Solvent Green 3, C.I. Solvent Black 3, C.I. Solvent Black 5, C.I. Solvent Black 7, C.I. Solvent Black 22, C.I. Solvent Black 26, C.I. Solvent Black 27, C.I. Solvent Black 29 (VALIFAST BLACK 3808 or ORASOL RLI), C.I. Acid Black 123, C.I. Solvent Black 48 (MORFAST BLACK 101), C.I. Oil Blue 613, and any combination thereof, and preferably one or more dyes selected from the group consisting of C.I. Solvent Black 29 (ORASOL BLACK RLI™), C.I. Solvent Black 27, C.I. Solvent Black 48, C.I. Solvent Black 3 (Oil Black 860), C.I. Basic Violet 3, C.I. Solvent Blue 38, C.I. Solvent Blue 70, C.I. Oil Blue 613, C.I. Solvent Red 49 (ORIENT PINK™ 312), C.I. Solvent Orange 54 (VALIFAST ORANGE™ 3210), and any combination thereof.

In any of the embodiments above, the dye may be present in an amount from about 0.01% to about 10%, preferably from about 0.5% to about 7%, and more preferably from about 1% to about 5% by weight of the ink jet ink composition.

In any of the embodiments above, any suitable humectant can be used. Preferably, humectants have a boiling point greater than 150° C., greater than 200° C., or greater than 250° C., and/or a relative evaporation rate less than 1.0, less than 0.9, less than 0.7, less than 0.4, less than 0.1, or less than 0.01. The humectants typically are solvents having one or more polar functional groups such as hydroxyl, ether, amide, ester, ketone, and carbonate, for example, two functional groups, which may be the same or different, such as two hydroxyl groups or one hydroxyl group and one ether group. In an embodiment, the one or more humectants are selected from the group consisting of polyol, glycol ether, diacetone alcohol, 2-pyrrolidinone, N-methylpyrrolidinone, ethyl lactate, butyl lactate, propylene carbonate, 1,3-dimethyl-2-imidazolidindione, and alkyl esters, and any combination thereof.

For example, the polyol is selected from the group consisting of polyethylene glycol, polypropylene glycol, poly(ethylene-co-propylene glycol), trimethylol propane, ethylene glycol, glycerin, diethylene glycol, triethylene glycol, tripropylene glycol, tetraethylene glycol, pentaethylene glycol, 1,2-propylene glycol, 1,3-propanediol, butylene glycol, triethylene glycol, 1,2,6-hexanetriol, thiodiglycol, hexylene glycol, bis-2-hydroxyethyl ether, 1,4-butanediol, 1,2-butenediol, 1,4-butenediol, 1,3-butenediol, 1,5-pentanediol, 2,4-pentanediol, 2,4-heptanediol, 1,8-octanediol, 1,10-decanediol, 1,12-dodecanediol, 1,4-cyclohexanediol, 1,4-cyclohexanedimethanol, 1,2-bis(hydroxymethyl)cyclohexane, 1,2-bis(hydroxyethyl)-cyclohexane, 3-methyl-1,5-pentanediol, 2,2,4-trimethyl-1,3-pentanediol, neopentyl glycol, pentaerythritol, sorbitol, mannitol, and any combination thereof, and preferably the polyol is selected from the group consisting of polyethylene glycol, trimethylol propane, ethylene glycol, propylene glycol, glycerin, diethylene glycol, tripropylene glycol, and any combination thereof, A preferred humectant is glycol ether, for example, a glycol ether selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol n-propyl ether, tripropylene glycol t-butyl ether, tripropylene glycol n-butyl ether, ethyl cellosolve, methyl cellosolve, polyethylene glycol monomethyl ether, polypropylene glycol monomethyl ether, methoxytriglycol, ethoxytriglycol, butoxytriglycol, 1-butoxyethoxy-2-propanol, and any combination thereof, and preferably, the glycol ether is selected from the group consisting of ethylene glycol monomethyl ether, ethylene glycol monoethyl ether, propylene glycol monomethyl ether, tripropylene glycol monomethyl ether, ethylene glycol monobutyl ether, diethylene glycol monomethyl ether, diethylene glycol monoethyl ether, and any combination thereof. In certain embodiments, propylene glycol monomethyl ether is a preferred humectant.

Humectants may contribute, at least in part, to a feature of the thermal ink jet ink composition. Thus, humectants may help lengthen decap times. In any of the embodiments, the one or more humectants may be present in any suitable amount, for example, in an amount about 40% by weight or less, preferably about 30% by weight or less, about 25% by weight or less, about 20% by weight or less, about 15% by weight or less, or about 10% by weight or less. In an embodiment, the one or more humectants may be present in an amount from about 1% to about 30%, preferably from about 2% to about 15%, and more preferably from about 3% to about 10% of the ink jet ink composition.

In another embodiment, the thermal ink jet ink composition includes tetrahydrofuran at less than 5% by weight, less than 1% by weight, less than 0.5% by weight, or less than 0.1% by weight of the ink jet ink composition. In another embodiment, the thermal ink jet ink composition includes binder resin at less than 5% by weight, less than 1% by weight, less than 0.5% by weight, or less than 0.1% by weight of the ink jet ink composition. In one embodiment, the thermal ink jet ink composition includes water at less than 5% by weight, less than 1% by weight, less than 0.5% by weight, or less than 0.1% by weight of the ink jet ink composition. In other embodiments, the thermal ink jet ink composition is preferably free or substantially free of tetrahydrofuran, binder resin, and water. By "substantially free" is meant that the component, if present at all, is present in such small quantities that it does not materially affect the properties of the ink composition.

In a particular embodiment of the thermal ink jet ink composition, the volatile organic solvent or solvents may be present in an amount from about 50% to about 95% by weight, the dye may be present in amount from about 1% to about 8% by weight, and the humectant may be present in an amount from about 3% to 30% by weight.

The thermal ink jet ink composition can further include one or more additives such as surfactants, and plasticizers. Preferably, a polymeric surfactant is employed. Examples of surfactants include modified polysiloxanes, alkyl modified polyoxyalkyleneamines, alkyl modified propoxylated (poly(oxypropylene)) diamines, alkyl ether amines, nonyl phenol ethoxylates, ethoxylated fatty amines, fluorinated organic acid diethanolamine salts, alkoxylated ethylenediamines, alkyl modified polyethylene oxides, alkyl modified polyalkyleneoxides, alkyl phosphate ethoxylate mixtures, polyoxyalkylene derivatives of propylene glycol, and polyoxyethylated fatty alcohols. A specific example of a suitable polymeric surfactant, e.g., Silicone Fluid SF-69, available from General Electric, which is a blend of silanols and cyclic silicones. Another specific example of surfactant is SILWET L7622™ which is a siloxane polyalkyleneoxide copolymer (Momentive Performance Chemicals, USA).

In any of the embodiments, the surfactants can be present in an amount from about 0.01 to about 2.0%, preferably from about 0.02 to about 1%, and more preferably from about 0.03 to about 0.5% of the ink jet ink composition.

Examples of suitable plasticizers include phthalate plasticizers, e.g., alkyl benzyl phthalates, butyl benzyl phthalate, dioctyl phthalate, diisobutyl phthalate, dicyclohexyl phthalate, diethyl phthalate, dimethyl isophthalate, dibutyl phthalate, and dimethyl phthalate, esters such as di-(2-ethylhexy)-adipate, diisobutyl adipate, glycerol tribenzoate, sucrose benzoate, dibutyl sebacate, dibutyl maleate, polypropylene glycol dibenzoate, neopentyl glycol dibenzoate, dibutyl sebacate, and tri-n-hexyltrimellitate, phosphates such as tricresyl phosphate, dibutyl phosphate, polyurethanes, and sulfonamide plasticizers such as Plasticizer 8, available from Monsanto Co., St. Louis, Mo., which is n-ethyl o,p-toluene sulfonamide.

In certain embodiments, the plasticizer can be present in an amount from about 0.1 to about 5.0%, preferably from about 0.3 to about 3.0%, and more preferably from about 0.5 to about 2.0% of the ink jet ink composition The thermal ink jet ink composition may include additional ingredients such as bactericides, fungicides, algicides, sequestering agents, buffering agents, corrosion inhibitors, antioxidants, light stabilizers, anti-curl agents, thickeners, and other agents known in the relevant art. In an embodiment, the ink composition is free or substantially free of antioxidants. The ink composition preferably includes no more than small amounts of water. In particular, the ink composition may include less than 2%, 1%, 0.5%, or 0.1% by weight water. The ink composition may be substantially free of water.

The thermal ink jet ink composition has one or more attractive features such as short unassisted dry times of printed alphanumeric or graphic images, long decap times, good adhesion to semi-porous and non-porous substrates, and safety or material compatibility with one or more components of a thermal ink jet printer. For example, embodiments of the thermal ink jet ink composition have a dry time of about 10 seconds or less, such as 5 seconds or less, 4 seconds or less, or 2 seconds or less, under ambient conditions. On porous substrates, the dry times are shorter than in semi- or non-porous substrates. For example, embodiments of the thermal ink jet ink composition have a dry time of about 1 second on porous substrates and less than about 5 seconds, preferably less than about 2 seconds, and more preferably less than about 1 second on semi-porous substrates. The thermal ink jet ink composition preferably has a decap time of at least 15 seconds, more preferably at least 30 seconds, 1 minute, 5 minutes, 10 minutes, or 20 minutes, and most preferably at least 30 minutes, when used in a thermal ink jet print head.

The thermal ink jet ink composition may have any suitable viscosity or surface tension. In embodiments of the invention, the thermal ink jet ink composition has a viscosity of less than about 10 cPs, preferably less than about 5 cPs, and more preferably less than about 3 cPs, for example, a viscosity from about 1 to 4 or from about 1 to about 3 cPs at 25° C.

In embodiments of the invention, the thermal ink jet ink composition has a surface tension from about 18 to about 50 mN/m, from about 20 to about 40 mN/m, or from about 22 to about 30 mN/m at 25° C.

The thermal ink jet ink composition may be prepared by any suitable method. For example, the chosen ingredients may be combined and mixed with adequate stiffing and the resulting fluid filtered to remove any undissolved impurities.

The present disclosure further provides a method for printing images on a substrate in a thermal ink jet printer comprising directing a stream of droplets of any of the embodiments of the thermal ink jet ink composition to a substrate and allowing the ink droplets to dry, thereby printing images on a substrate. The thermal ink jet ink composition may be provided in a thermal in jet cartridge including a thermal ink jet print head. Any suitable substrate may be printed. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

Examples of polymer coating include a coating of polystyrene, polyvinyl alcohol, polyacryate, polymethacrylate, polystryrene or polyvinyl chloride. Examples of polymer film substrates include polyvinyl butyrals, polyolefins, polyvinyl chloride, polyethylene terephthalate, PETG, polybutylene terephthalate (PBT), polyester, polycarbonate, acrylonitrile-butadiene-styrene (ABS) copolymer, polyvinyl fluoride polymer, polyamides, polyimides, and cellulose. Plastics may be treated plastics (e.g. chemical etch, corona discharge, flame plasma, etc.) or untreated plastics. Examples of metals include aluminum, copper, stainless steel, and metal alloys. Examples of ceramics include oxides, nitrides, and carbides of metals.

The following examples further illustrate the invention but, of course, should not be construed as in any way limiting its scope. The following Examples illustrate the preparation of an ink composition suitable for use in a thermal ink printer. In each case, the ingredients were combined and mixed until all solid components were dissolved. The resulting mixture was filtered to remove any particulates and the ink composition was recovered. The ink composition was printed using a representative thermal ink jet printer on a variety of non-porous substrates including glass, aluminum, polyethylene, polypropylene, and polyvinyl chloride. The decap time was measured by printing an image consisting of 100 vertical bars that were 1 dot wide for the full width of the nozzle array, allowing the print head to remain idle for the specified period of time, then reprinting the same image without wiping or other maintenance. The decap time is the maximum amount of time the print head can remain uncapped and fully recover within the first 20% of the vertical lines. The drying time was measured by printing representative alphanumeric text, and gently sliding a finger across the text every second (or interval of seconds) and observing when the image no longer smears.

EXAMPLE 1

Example 1 illustrates embodiments of a thermal ink jet ink composition. The materials employed in preparing the ink jet ink composition, their amounts, and the formulation numbers are set forth in Table 1 below. The formulations in Table 1 used a mixture of MEK and methanol as a solvent, with a variety of dyes. Comparative Examples A and B are similar ink formulations which included binder resins It can be seen that the inventive ink formulations had decap times of 60 sec or greater, with the longest decap times over 10 minutes. By comparison, the resin-containing ink formulation had much shorter decap times.

TABLE 1

| Material | Comp. Example A | Comp. Example B | 11610 | 11562 | 11603 | 11617 | 11563 | 11611 | 11572 | 11657 | 11648 | 11649 |
| --- | --- | --- | --- | --- | --- | --- | --- | --- | --- | --- | --- | --- |
| MEK | 42.00 | 40.50 | 42.50 | 43.00 | 42.75 | 44.00 | 43.00 | 43.00 | 43.00 | 42.75 | 43.00 | 43.00 |
| methanol | 42.00 | 40.50 | 42.50 | 43.00 | 42.75 | 44.00 | 43.00 | 43.00 | 43.00 | 42.75 | 43.00 | 43.00 |
| glycol ether PM | 10.00 | 10.00 | 10.00 | 10.00 | 10.00 | 10.00 | 10.00 | 10.00 | 10.00 | 10.00 | 10.00 | 10.00 |
| Silicone Fluid SF69 | 0.01 | 0.01 | 0.01 | 0.01 | 0.01 | 0.01 | 0.01 | 0.01 | 0.01 | | 0.01 | 0.01 |
| Silwet L-7622 | | | | | | | | | | 0.50 | | |
| Plasticizer 8 | 0.50 | | 1.00 | | 0.50 | | | | | | | |
| Valifast Black 3808 | 4.00 | | 4.00 | | | | | | | | | |
| Orasol Black RLI | | 4.00 | | 4.00 | | | | | | | | |
| Duasyn Black ARG VP-280 | | | | | | 4.00 | 2.00 | | | | | |
| Orient Oil Pink 312 | | | | | | | | 4.00 | | | | |
| Valifast Orange 3210 | | | | | | | | | 4.00 | | | |
| Basic Violet 3 | | | | | | | | | | 4.00 | | |
| Oil Black 860 | | | | | | | | | | 4.00 | | |
| Valifast Black 3840L | | | | | | | | | | | 4.00 | |
| Morfast Black 101 | | | | | | | | | | | | 4.00 |
| Nobel DHX 3-5 | 1.50 | | | | | | | | | | | |
| Joncryl 682 | | 5.00 | | | | | | | | | | |
| Viscosity (cPs) | 1.02 | 0.90 | 0.8 | 0.75 | 0.77 | 0.67 | 0.65 | 0.64 | 0.67 | | | |
| Surface Tension (dynes/cm) | 23.7 | 24.8 | 24.9 | 23.3 | 24.8 | 23.9 | 23.1 | 24 | 23.8 | | | |
| Decap Time (sec) | 10 | 45 | 120 | >600 | 90 | >600 | 120 | 1200 | 120 | 60 | 90 | >120 |
| Avg. Dry Time (sec) | | | 1.6 | 1.9 | 1.8 | 1.3 | | 1.0 | | 1.9 | 1.1 | 1.4 |

EXAMPLE 2

Example 2 illustrates embodiments of a thermal ink jet ink composition. The materials employed in preparing the ink jet ink composition, their amounts, and the formulation numbers are set forth in Table 2 below. The formulations in Table 2 used ethanol as a solvent, with a variety of dyes. Comparative Example C is a similar ink formulation which included a binder resin.

It can be seen that the inventive ink formulations had decap times of 5 minutes or greater, with the longest decap times over 20 minutes. By comparison, the resin-containing ink formulation had much shorter decap times.

TABLE 2

| Material | Comparative Example C | 5817 | 5818 | 5821 | 5819 | 5824 | 5820 |
|---|---|---|---|---|---|---|---|
| ethanol | 79.49 | 85.99 | 85.99 | 85.99 | 85.99 | 85.99 | 85.99 |
| glycol ether PM | 10.00 | 10.00 | 10.00 | 10.00 | 10.00 | 10.00 | 10.00 |
| Silicone Fluid SF69 | 0.01 | 0.01 | 0.01 | 0.01 | 0.01 | 0.01 | 0.01 |
| Plasticizer 8 | 0.50 | | | | | | |
| Valifast Black 3808 | 4.00 | 4.00 | | | | | |
| Orasol Black RLI | | | 4.00 | | | | |
| Duasyn Black ARG VP-280 | | | | 4.00 | | | |
| Orient Oil Pink 312 | | | | | 4.00 | | |
| Valifast Orange 3210 | | | | | | 4.00 | |
| Basic Violet 3 | | | | | | | 4.00 |
| Joncryl 682 | 6.00 | | | | | | |
| Viscosity (cPs) | 2.00 | 1.54 | 1.63 | 1.55 | 1.48 | 1.47 | 1.47 |
| Surface Tension (dynes/cm) | 22.8 | 19.7 | 21.9 | 22.2 | 22.1 | 24 | 22.6 |
| Decap Time (sec) | 30 | 300 | >600 | 300 | 300 | 1200 | 600 |
| Avg. Dry Time | | 1.5 | 2.0 | — | — | — | — |

EXAMPLE 3

Example 3 illustrates embodiments of a thermal ink jet ink composition. The materials employed in preparing the ink jet ink composition, their amounts, and the formulation numbers are set forth in Table 3 below. The formulations in Table 3 used ethanol as a solvent.

It can be seen that the ink formulations had decap times of 1 minute or greater, with the longest decap times over 20 minutes.

TABLE 3

| | 5876 | 5877 | 5880 | 5881 | 5900 |
|---|---|---|---|---|---|
| ethanol SDA-3C | 90.20 | 90.15 | 86.92 | 73.75 | 95.45 |
| diacetone alcohol | 5.00 | 5.00 | 4.97 | | |
| NMP | | | 2.98 | | |
| PM | | | | 20.00 | |
| plasticizer 8 | 1.00 | 1.00 | 0.99 | 1.50 | 0.5 |
| Silicone SF69 | 0.05 | 0.10 | 0.40 | 1.00 | |
| Valifast Black 3808 | 3.00 | 3.00 | 2.98 | 3.00 | |
| Orasol Black RLI | | | | | 3.25 |
| Valifast Orange 3210 | 0.75 | 0.75 | 0.75 | 0.75 | 0.75 |
| Decap Time | 300-600" | 300-600" | 60" | >120" | >600" |
| Dry Time-aqueous | 2 | 2 | 10 | 5 | 1 |
| Dry Time-varnish | 2 | 2 | >10 | 5-10" | 1 |
| Dry Time-clay | 1 | 1 | 1 | 1 | 1 |

From the Examples above, it can be seen the various additives may be used in the thermal ink jet ink compositions disclosed herein to extend the decap times in a thermal ink jet printer.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A solvent-based ink composition for a thermal inkjet printhead, the ink composition comprising:
    (a) 55-90 wt. % of an organic solvent comprising a ketone and a $C_1$ to $C_4$ alcohol;
    (b) 0.01-10 wt. % of a colorant; and
    (c) one or more humectants, wherein the thermal ink jet ink composition is free or substantially free of binder resin, and wherein the ink composition has a decap time of at least 30 seconds when used in the thermal inkjet printhead.

2. The ink composition of claim 1, wherein the ketone is methyl ethyl ketone.

3. The ink composition of claim 1, wherein the ketone is cyclohexanone.

4. The ink composition of claim 1, wherein the $C_1$ to $C_4$ alcohol is ethanol.

5. The ink composition of claim 1, wherein the colorant is a dye or a pigment.

6. The ink composition of claim 1, further comprising: 0.01-2 wt. % of a surfactant.

7. The ink composition of claim 6, wherein the surfactant is a nonionic surfactant.

8. The ink composition of claim 6, wherein the surfactant is non-polymeric.

9. The ink composition of claim 1, wherein the composition does not comprise any polymers.

10. The ink composition of claim 1, consisting essentially of the ketone, the $C_1$ to $C_4$ alcohol and the colorant.

11. An ink cartridge for a thermal inkjet printhead, the ink cartridge containing the solvent-based ink composition according to claim 1.

12. The ink cartridge of claim 11, wherein the ink cartridge comprises the thermal inkjet printhead integrated therewith.

13. A substrate having an ink composition according to claim 1 disposed thereon.

14. The substrate of claim 13, which is a semi-porous or non-porous substrate.

15. A method of ejecting ink from a thermal inkjet printhead, the method comprising the steps of:
  (i) supplying an ink to at least one nozzle chamber of the printhead; and
  (ii) actuating a heater element in the nozzle chamber and heating the ink to a temperature sufficient to form a bubble therein, thereby causing the ink to be ejected from a nozzle opening associated with the nozzle chamber,
  wherein the ink is a solvent-based ink composition comprising:
    (a) 55-90 wt. % of an organic solvent comprising a ketone and a $C_1$ to $C_4$ alcohol;
    (b) 0.01-10 wt. % of a colorant; and
    (c) one or more humectants, wherein the thermal ink let ink composition is free or substantially free of binder resin, and wherein the ink composition has a decap time of at least 30 seconds when used in the thermal inkjet printhead.

16. The method of claim 15, wherein the ink is ejected onto a non-porous or a semi-porous substrate.

17. The method of claim 16, wherein the ink adheres to the substrate.

18. The method of claim 16, wherein the substrate is a plastics substrate.

19. The method of claim 15, wherein the ketone is methylethylketone.

20. The method of claim 15, wherein the ketone is cyclohexanone.

21. The method of claim 15, wherein the $C_1$ to $C_4$ alcohol is ethanol.

22. The method of claim 15, further comprising: 0.001-2 wt. % of a surfactant.

23. The method of claim 15, wherein the ink composition does not comprise any polymers.

24. The method of claim 15, wherein the ink composition consists only of the ketone, the $C_1$ to $C_4$ alcohol and the colorant.

25. The method of claim 15, wherein the ink composition consists only of the ketone, the $C_1$ to $C_4$ alcohol, the colorant and 0.01-2 wt. % of a surfactant.

26. An inkjet printer comprising:
  an ink reservoir containing a respective ink; and
  a thermal inkjet printhead in fluid communication with the ink reservoir,
  wherein the ink is a solvent-based ink composition comprising:
    (a) 55-90 wt. % of an organic solvent comprising a ketone and a $C_1$ to $C_4$ alcohol;
    (b) 0.01-10 wt. % of a colorant; and
    (c) one or more humectants, wherein the thermal ink jet ink composition is free or substantially free of binder resin, and wherein the ink composition has a decap time of at least 30 seconds when used in a thermal inkjet print head.

27. The inkjet printer of claim 26, wherein the thermal inkjet printhead comprises a plurality of nozzles, each of the plurality of nozzles comprising:
  a nozzle chamber containing the ink, the nozzle chamber having a nozzle opening for ejection of the ink; and
  a heater element in contact with the ink, the heater element being configured for heating the ink to a temperature sufficient to form a bubble therein and thereby cause ejection of the ink from the nozzle opening.

* * * * *